(12) United States Patent
Mere (10) Patent No.: US 11,073,844 B2
(45) Date of Patent: Jul. 27, 2021

(54) METHOD AND AVIONIC SYSTEM FOR GENERATING AN OPTIMUM VERTICAL TRAJECTORY

(71) Applicant: Airbus Operations (S.A.S.), Toulouse (FR)

(72) Inventor: Jean-Claude Mere, Verfeil (FR)

(73) Assignee: Airbus Operations (S.A.S.), Toulouse (FR)

( * ) Notice: Subject to any disclaimer, the term of this patent is extended or adjusted under 35 U.S.C. 154(b) by 13 days.

(21) Appl. No.: 16/697,989

(22) Filed: Nov. 27, 2019

(65) Prior Publication Data
US 2020/0183427 A1    Jun. 11, 2020

(30) Foreign Application Priority Data
Dec. 6, 2018   (FR) ...................................... 1872424

(51) Int. Cl.
*G05D 1/00*      (2006.01)
*G05D 1/10*      (2006.01)
(Continued)

(52) U.S. Cl.
CPC ............. *G05D 1/101* (2013.01); *B64C 13/00* (2013.01); *B64C 15/02* (2013.01)

(58) Field of Classification Search
CPC ........ G16H 10/60; G16H 40/67; G16H 80/00; G16H 40/40; H04W 4/90; G08B 25/016; H04L 67/306
See application file for complete search history.

(56) References Cited

U.S. PATENT DOCUMENTS 7,772,547 B2 *   8/2010   Verentchikov ........ H01J 49/406
                                                                                                                                       250/287
2012/0265374 A1    10/2012   Yochum

FOREIGN PATENT DOCUMENTS

EP             2 667 273 A1    11/2013
WO    WO 2015/155202 A1    10/2015

OTHER PUBLICATIONS

Barnier et al., "Optimization by hybridization of a genetic algorithm with constraint satisfaction techniques," IEEE 1998, World Congress on Computational Intelligence, May 1998, Anchorage, United States, pp. 645-649.

(Continued)

*Primary Examiner* — Ian Jen
(74) *Attorney, Agent, or Firm* — Jenkins, Wilson, Taylor & Hunt, P.A.

(57) ABSTRACT

A method for generating an optimum vertical trajectory of a flight trajectory of an aircraft in the descent/approach phase. The trajectory is defined between a current state and a target state of the aircraft on the basis of a speed profile of the aircraft as a function of a curvilinear abscissa of the aircraft along a flight plan. The profile corresponds to a transition between the current and target states and is broken down into successive segments each corresponding to a different aerodynamic configuration that the aircraft may adopt during the descent/approach phase. The method is based on defining a set of flight strategies, each strategy of the set being defined using for each segment of the speed profile flight parameters chosen randomly in ranges of values compatible with the aerodynamic configuration corresponding to that segment. Optimum vertical trajectory is generated on the basis of the strategy of the set.

6 Claims, 4 Drawing Sheets

(51) Int. Cl.
 B64C 13/00 (2006.01)
 B64C 15/02 (2006.01)

(56) References Cited

OTHER PUBLICATIONS

Barnier et al., "Optimisation par algorithme genetique sous contraintes," Technique et Science Informatiques, Hermes-Lavoisuer, 1999, 18 (1), pp. 1-29, Hal-00934534.
Ruby et al., "Trajectory Optimization for vertical navigation using the Harmony Search algorithm," International Federation of Automatic Control, IFAC-PapersOnLine 49-17, 2016, pp. 11-16.
Ruby et al., "Optimisation des trajectoires verticales par la methode de la recherche de l 'harmonie par Margaux RUBY," École de technologie supérieure Université du Québec, Montreal, Janvier 10, 2017, Presentation.
French Search Report for Application No. 1872424 dated Jul. 26, 2019.

\* cited by examiner

METHOD AND AVIONIC SYSTEM FOR GENERATING AN OPTIMUM VERTICAL TRAJECTORY

CROSS-REFERENCE TO RELATED APPLICATION

This application claims the benefit of and priority to French patent application number 18 72424 filed on Dec. 6, 2018, the entire disclosure of which is incorporated by reference herein.

TECHNICAL FIELD

The disclosure herein concerns a method and a device for generating a vertical trajectory of a flight trajectory for an aircraft, such as a transport aircraft, in the descent/approach phase. The disclosure herein more particularly concerns generating, with the aid of onboard devices, an optimized descent/approach trajectory in real time and in accordance with one or more predefined criteria.

BACKGROUND

An aircraft, in particular a transport aircraft, generally has a flight management system (FMS) enabling a crew of the aircraft to store a flight plan consisting of waypoints before a flight. On the basis of this flight plan the FMS calculates different flight parameters comprising time, fuel quantity, altitude and speed parameters along the flight plan.

A flight includes a descent/approach phase prior to landing. For the descent/approach phases current FMS generate a reference profile comprising an altitude profile and a speed profile (that is to say altitude and speed variations as a function of a curvilinear abscissa of the aircraft along the flight plan) to stabilize the aircraft at a predefined approach speed $V_{App}$ at a predefined altitude $Z_{App}$ (i.e. approximately one thousand feet above an altitude of the runway threshold). The profile is calculated using predefined hypotheses in terms of successive aircraft commands and strategies used to dissipate the kinetic and potential energy of the aircraft. From one reference profile calculation to another, the FMS therefore considers, for example, that each aerodynamic configuration of the aircraft (configuration of the slats, flaps and/or undercarriage) is employed at the same speed.

This kind of operation of the FMS implies that as a function of operational constraints that may have been imposed on the aircraft during its descent (for example air traffic control setpoints), the vertical trajectory induced by the reference profile, termed the reference vertical trajectory, does not systematically pass through the aircraft. FIG. 2 represents an example of a speed (bottom part of FIG. 2) and altitude (top part of FIG. 2) reference profile calculated by a conventional FMS for an aircraft 1 (represented to a larger scale in FIG. 1). In FIG. 2, S is a curvilinear abscissa along a flight plan, V is a speed of the aircraft 1, Z is an altitude of the aircraft 1, $V_{opt}$ is a rate of descent of the aircraft 1, $V_c$ is a speed constraint, conf i (i from "1" to "4"), smooth and gear representing aerodynamic configurations of the aircraft 1. In FIG. 2 it is seen that during the calculation of the reference profile the aircraft 1 is located outside the speed reference profile and outside the altitude reference profile. It is then up to the crew to manage rejoining the reference profile. In other words, the crew must evaluate an energy situation of the aircraft 1 and carry out piloting actions that are adequate for managing possible over-energy or under-energy situations of the aircraft 1. In some scenarios in which the aircraft 1 has been deviated from its reference vertical trajectory, for example for air traffic control purposes, the simultaneous management of the energy situation of the aircraft 1, of the modification of the flight plan and of the piloting of the aircraft 1, which necessitates multiple interactions with the systems of the aircraft 1, generates a heavy workload for the crew. In critical situations, in the event of incapacity of a pilot for example, such a workload could prove difficult to manage for the rest of the crew.

It is desirable to alleviate these disadvantages of the prior art. It is in particular desirable to propose a method enabling at any time automatic definition of a reference profile inducing a reference vertical trajectory passing through a current position of the aircraft. In this way the crew would not have to concern themselves with rejoining the reference profile. It is moreover desirable for the profile generated to be the optimum in accordance with one or more predefined criteria such as fuel consumption, time, financial cost, noise level, production of nitrogen oxide NOx, etc.

SUMMARY

An object of the disclosure herein is a method for generating an optimum vertical trajectory of a flight trajectory of an aircraft in the descent/approach phase, the vertical trajectory being defined between a current state of the aircraft comprising a so-called current position and a so-called target state comprising a so-called target position, the vertical trajectory being defined on the basis of a profile of a value representing a kinetic and potential energy of the aircraft as a function of a curvilinear abscissa of the aircraft along a flight plan, the profile corresponding to a transition between the current state and the target state and being broken down into a plurality of successive segments each corresponding to a different aerodynamic configuration that the aircraft can adopt during a descent/approach phase, each junction point between two segments corresponding to a passage of the aircraft through an intermediate state, each transition between two states enabling dissipation of some of the kinetic and potential energy of the aircraft between the two states. The method is executed by an avionic system onboard the aircraft and comprises the following successive steps: a processing step during which the avionic system works through the profile from the target state to the current state and obtains, for each segment preceding an intermediate state, termed an associated segment, a range of values representing the kinetic potential energy of the aircraft authorized for the aerodynamic configuration corresponding to the segment, termed an authorized range, and a definition step during which the avionic systems defines the optimum vertical trajectory on the basis of a flight strategy minimizing a cost according to at least one particular predefined criterion in a set of flight strategies, termed the first set, each strategy of the first set being defined by associating first and second values with each intermediate state, each first value corresponding to a value representing the kinetic and potential energy of the aircraft when the aircraft enters the intermediate state chosen randomly in the authorized range corresponding to the segment associated with the state, each second value being a level of thrust of at least one engine of the aircraft or a level of deflection of spoilers of the aircraft chosen randomly in a range of possible values, then adding to the strategy an additional segment enabling the strategy to rejoin the current state: the flight strategy minimizing the cost being determined during a final iteration of an iterative procedure comprising on each iteration: a grouping step during which the avionic system groups the strategies of the first set two by two to form first pairs of strategies; an obtaining step during which the avionic system obtains the cost of each strategy, the cost of a strategy depending on values comprising the first and second values associated with each intermediate state of the strategy; a reduction step during which the avionic system reduces the first set by eliminating the strategy of each first pair having the highest cost; a step of formation of new strategies during which the avionic system groups the remaining strategies of the first set two by two so as to form second pairs of strategies; and during which, for each second pair, the avionic system forms a new strategy of the first set on the basis of the first and second values associated with each intermediate state of the strategies of the second pair; a completion step during which the avionic system adds to the first set strategies different from the strategies already considered until the number of strategies that is a multiple of four is attained; and, a determination step during which the avionic system determines the strategy of the first set, termed the best strategy, minimizing the cost; the iterative procedure being repeated by the avionic system as long as a cost difference between the best strategies of two successive iterations is greater than a predetermined threshold.

The method therefore makes it possible to determine an optimum vertical trajectory in accordance with a predefined criterion passing through the current state of the aircraft.

According to one embodiment, each value representing a kinetic and potential energy of the aircraft is, respectively, a speed and an altitude along the vertical trajectory.

According to one embodiment, the predefined criterion is a fuel consumption and/or flight time and/or noise and/or nitrogen oxide emission criterion.

According to one embodiment, the method comprises: obtaining constraints of the flight plan comprising altitude and/or speed constraints to be complied with over certain portions of the descent/approach phase and dividing into sub-segments the segments concerned by the constraints.

According to one embodiment, during the definition of a strategy the first value associated with each intermediate state is defined successively for each intermediate state by working through the intermediate states in order from the intermediate state closest to the target position to the farthest intermediate state and if the first value of a first intermediate state is less than the first value of a second intermediate state preceding the first intermediate state, the first intermediate state is eliminated and a segment is created for directly connecting the second intermediate state to a state following the first intermediate state.

According to a second aspect of the disclosure herein, the disclosure herein concerns an avionic system for generating an optimum vertical trajectory of a flight trajectory of an aircraft in the descent/approach phase, the vertical trajectory being defined between a current state of the aircraft comprising a so-called current position and a so-called target state comprising a so-called target position, the vertical trajectory being defined on the basis of a profile of a value representing a kinetic and potential energy of the aircraft as a function of a curvilinear abscissa of the aircraft along a flight plan, the profile corresponding to a transition between the current state and the target state and being broken down into a plurality of successive segments each corresponding to a different aerodynamic configuration that the aircraft can adopt during a descent/approach phase, each junction point between two segments corresponding to a passage of the aircraft through an intermediate state, each transition between two states enabling dissipation of some of the kinetic and potential energy of the aircraft between the two states. The avionic system comprises: a processor for working through the profile from the target state to the current state, the system configured for obtaining, for each segment preceding an intermediate state, termed an associated segment, a range of values representing the kinetic and potential energy of the aircraft authorized for the aerodynamic configuration corresponding to the segment, termed an authorized segment; and, the system configured for defining the optimum vertical trajectory on the basis of a flight strategy minimizing a cost according to at least one particular predefined criterion in a set of flight strategies, termed a first set, each strategy of the first set being defined by associating first and second values with each intermediate state, each first value corresponding to a value representing the kinetic and potential energy of the aircraft when the aircraft enters the intermediate state chosen randomly in the authorized range corresponding to the segment associated with the state, each second value being a level of thrust of at least one engine of the aircraft or a level of deflection of the spoilers chosen randomly in a range of possible values, then by adding to the strategy an additional segment representing a transition between the intermediate state closest to the current state and the current state, the flight strategy minimizing the cost being determined by the system configured for executing an iterative procedure during a final iteration of the iterative procedure, the system configured for executing the iterative procedure comprising: the system configured and enabling grouping of the strategies of the first set two by two to form first pairs of strategies; the system configured for obtaining the cost of each strategy, the cost of a strategy depending on values comprising the first and second values associated with each intermediate state of the strategy; the system configured reducing the first set by eliminating the strategy of each first pair having the highest cost; the system configured for forming new strategies enabling grouping of the remaining strategies of the first set two by two to form second pairs of strategies; and, for each second pair, forming a new strategy of the first set from the first and second values associated with each intermediate state of the strategies of the second pair; the system configured for completion for adding to the first set strategies different from the strategies already considered until a number of strategies that is a multiple of four is attained; and, the system configured for determining the strategy of the first set, termed the best strategy, minimizing the cost: and, the system configured for halting the iterative procedure terminating the iterative procedure if a cost difference between the best strategies of two successive iterations is less than a predetermined threshold.

BRIEF DESCRIPTION OF THE DRAWINGS

The features of the disclosure herein mentioned hereinabove and others will become more clearly apparent on reading the following description of one embodiment, the description being given with reference to the appended, example drawings, in which.

DETAILED DESCRIPTION

The following detailed description aims to describe an embodiment of the disclosure herein in a context where a system for generating an optimum vertical trajectory during a descent/approach phase is in an aircraft. The principles of the disclosure herein apply in a broader context, however. The principles of the disclosure herein are in fact applicable with a system for generating an optimum trajectory located on the ground and communicating the optimum vertical trajectory to the aircraft once it has been defined.

Figure 1:
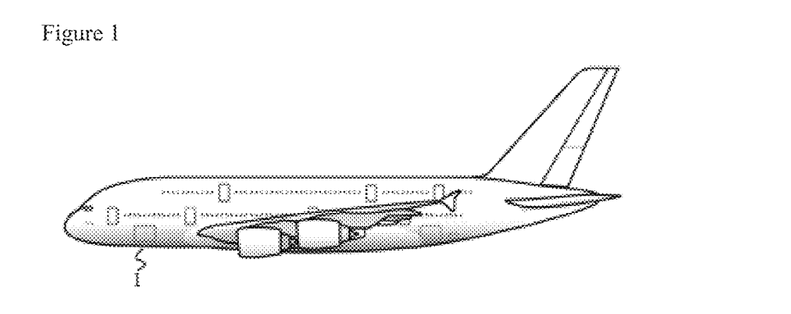
FIG. 1 represents diagrammatically an aircraft for which the disclosure herein is employed.
Figure 2:
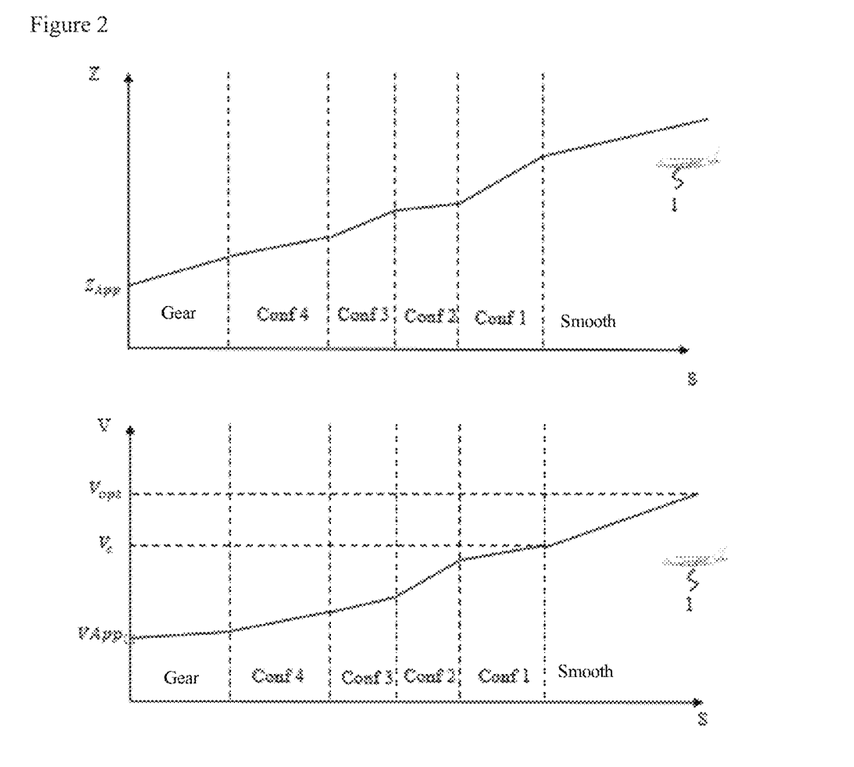
FIG. 2 represents a speed reference profile and an altitude reference profile given by an FMS.

FIG. 1 represents diagrammatically an aircraft 1 for which the disclosure herein is employed. This aircraft 1 is an aircraft about to commence a descent/approach phase to a runway of an airport.

Figure 4A:
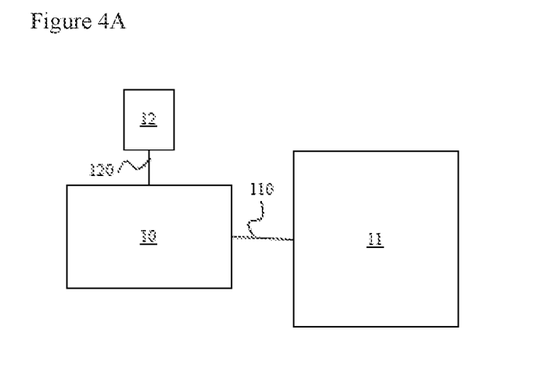
FIG. 4A illustrates an avionic system onboard an aircraft.

FIG. 4A illustrates an avionic system onboard the aircraft 1.

The avionic system comprises an FMS 11, a module 10 for generating an optimum vertical trajectory, hereinafter termed the optimization module, and a display device 12. The optimization module 10 is connected to the FMS 11 (respectively to the display device 12) by a network communication connection 110 (respectively 120). The FMS 11 is connected to a set of sensors such as temperature, pressure, speed, etc. sensors. The display system 12 displays a result of an optimization carried out by the optimization module 10 and for example information representing an optimum vertical trajectory to be followed by the aircraft 1 according to a predefined criterion.

In the embodiment from FIG. 4A the optimization module 10 is separate from the FMS 11. In another embodiment the optimization module 10 could be included in the FMS 11, or even implemented in software form by the FMS 11.

Figure 4B:
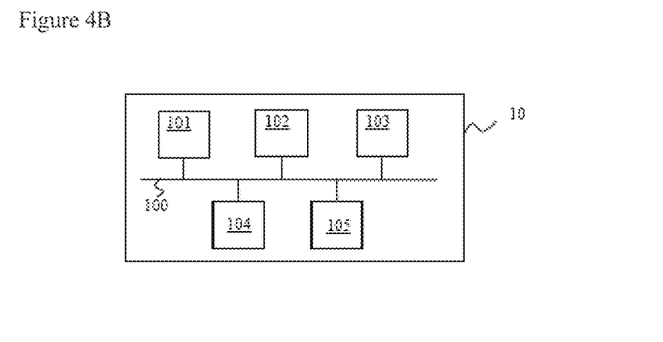
FIG. 4B illustrates an example of a hardware architecture of a module for generating an optimum vertical trajectory for an aircraft.

FIG. 4B illustrates an example of a hardware architecture of a module 10 for generating an optimum vertical trajectory.

According to the hardware architecture example represented in FIG. 4B the optimization module 10 then comprises, connected by a communication bus 100: a processor or CPU (central processing unit) 101; RAM (Random Access Memory) 102; ROM (Read Only Memory) 103; a storage unit such as an SD (Secure Digital) card or a storage medium reader, such as an SD card reader 104; and a communication interface 105 enabling the optimization module 10 to communicate in particular with the FMS 11 and the display device 12.

The processor 101 is able to execute instructions loaded into the RAM 102 from the ROM 103, from an external memory (not shown), from a storage medium (such as an SD card), or from a communication network. When the optimization module is powered up the processor 101 is able to read instructions from the RAM 102 and to execute them. These instructions form a computer program causing the execution by the processor 101 of the method described with reference to FIGS. 5 and 6.

All or part of the method described with reference to FIGS. 5 and 6 may be implemented in software form by execution of a set of instructions by a programmable machine, for example a DSP (Digital Signal Processor) or a microcontroller, or implemented in hardware form by a dedicated machine or component, for example an FPGA (Field-Programmable Gate Array) or an ASIC (Application-Specific Integrated Circuit).

Figure 5:
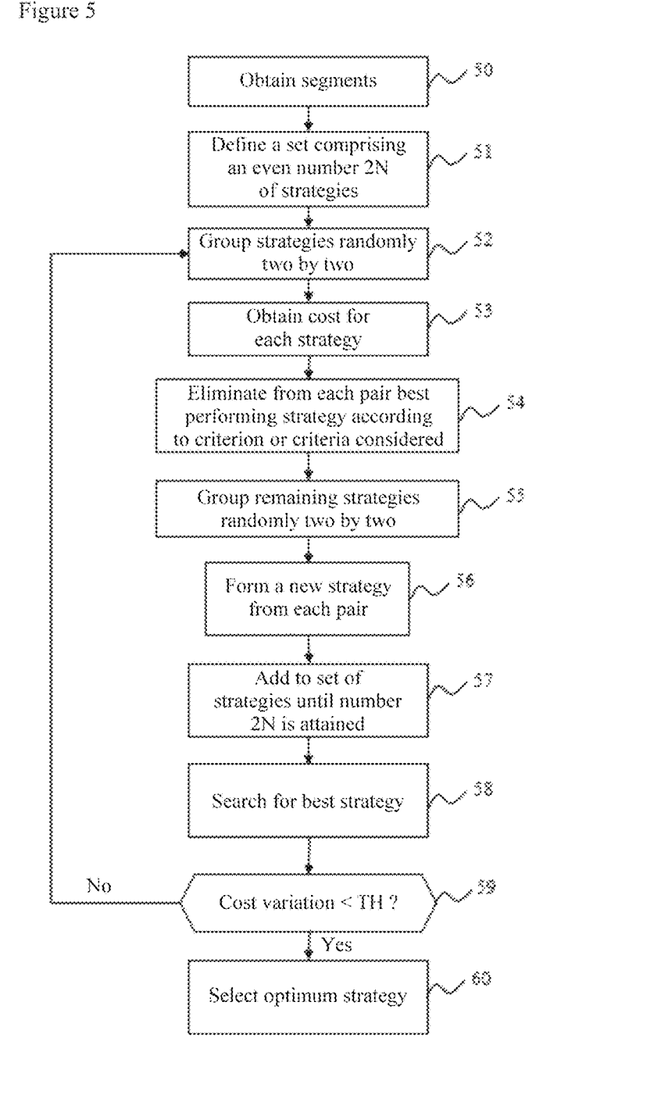
FIG. 5 illustrates diagrammatically a method for generating an optimum vertical trajectory for an aircraft; and, FIG. 6 illustrates diagrammatically a detail of the method for generation of an optimum vertical trajectory for an aircraft.

FIG. 5 illustrates diagrammatically a method for generating an optimum vertical trajectory for an aircraft.

The method from FIG. 5 is executed by the optimization module 10. This method tests a plurality of possible flight strategies for the descent/approach phase and, on the basis of the strategies tested, determines the optimum strategy according to at least one predefined criterion. The optimum strategy then enables definition of an optimum vertical trajectory. In one embodiment the predefined criterion is a fuel consumption criterion.

Each strategy is defined on the basis of a profile (i.e. a curve) of a value representing a kinetic and potential energy of the aircraft 1 as a function of a curvilinear abscissa of the aircraft 1 along the flight plan defined by the crew. In one embodiment the value representing the kinetic and potential energy of the aircraft 1 is a speed of the aircraft 1. In this case the profile of a value representing the kinetic and potential energy of the aircraft 1 as a function of a curvilinear abscissa of the aircraft 1 is a speed profile.

The speed profile corresponds to a transition between a current state and a target state of the aircraft 1. During the transition between the current state and the target state the aircraft 1 passes through a plurality of intermediate states corresponding to adoption of configurations in different aerodynamic configurations that the aircraft 1 is able to adopt during a descent/approach phase. Each aerodynamic configuration depends in particular on a position of the slats on the leading edge of the wing, the position of the lift surfaces of the aircraft 1 such as the spoilers and flaps and a position of the landing gear. During a descent/approach phase, the aircraft may adopt a variable number of different aerodynamic configurations not exceeding a maximum number NB_CONF_MAX of different possible aerodynamic configurations. In one embodiment, the maximum number of possible different configurations NB_CONF_MAX=6, corresponding to a smooth aerodynamic configuration (that is to say slats and gear retracted), for different slats deployed configurations and a configuration with the landing gear lowered.

In order to take into account these intermediate states the speed profile is broken down into a plurality of successive segments. Each segment is located between two states and corresponds to a part of the flight plan in which the aircraft 1 is in a given aerodynamic configuration. Each junction point between two segments therefore corresponds to passage of the aircraft 1 through an intermediate state. Considering that during a descent/approach phase the aircraft 1 passes through the maximum number NB_CONF_MAX of possible different aerodynamic configurations and that in the current state the aircraft 1 is in the smooth aerodynamic configuration, if NB_STATE is a number of intermediate states between the current state and the target state, and NB_SEG is a number of segments, NB_STATE=NB_CONF_MAX−1, and NB_SEG=NB_CONF_MAX. Note that, in the current state, the aircraft 1 could be in an aerodynamic configuration other than the smooth configuration. Each transition between two states (between two intermediate states, between the current state and an intermediate state or between an intermediate state and a target state) enables dissipation of some of the kinetic and potential energy of the aircraft 1 between the two states, the aim being that the aircraft 1 attains a predefined kinetic and potential energy in the target state.

A state of an aircraft comprises a position in space, for example a current position for the current state and a target position for the target state, and one or more flight parameters of the aircraft 1 having an impact on the kinetic and potential energy of the aircraft 1. In one embodiment the flight parameter or parameters taken into account comprise one or more of the following parameters:
- a speed of the aircraft 1;
- a thrust of the engines of the aircraft 1;
- a configuration of spoilers of the aircraft 1;
- an aerodynamic configuration of the aircraft 1.

The thrust of the engines is between zero and a maximum thrust denoted $Thrust_{max}$. The spoilers, when activated, generate a deflection between zero and a maximum deflection denoted $\delta_{max}$.

In a step 50 the optimization module 10 works through the intermediate states from the target state to the current state and attains for each segment preceding an intermediate state, termed an associated segment, a range of speed values of the aircraft 1 authorized for the aerodynamic configuration corresponding to the segment, termed an authorized range.

In steps 51 to 60 the optimization defines an optimum vertical trajectory on the basis of a flight strategy minimizing a cost according to at least one particular predefined criterion in a set of flight strategies.

In a step 51 the optimization module 10 defines a set of flight strategies, termed the first set, comprising a number of different flight strategies that is a multiple of four. A definition of a strategy consists in or comprises associating first and second values with each intermediate state. Each first value associated with an intermediate state corresponds to a speed (i.e. a value representing a kinetic and potential energy) of the aircraft 1 when the aircraft 1 enters the intermediate state. This first value is chosen randomly in the authorized range corresponding to the segment associated with the intermediate state. Each second value is a thrust level or a spoiler deflection level chosen randomly in a range of possible values for this second value. The range of possible values for the thrust level (respectively for the deflection level) is between zero and the maximum thrust $Thrust_{max}$ (respectively the maximum deflection $\delta_{max}$). At this stage the definition of the strategy has enabled definition of the segments connecting the target state to the intermediate state closest to the current state. The strategy obtained in this way generally does not pass through the current state of the aircraft 1. To ensure that the strategy passes through the current state an additional segment is added to the strategy using a method explained hereinafter with reference to a step 528 from FIG. 6.

Figure 6:
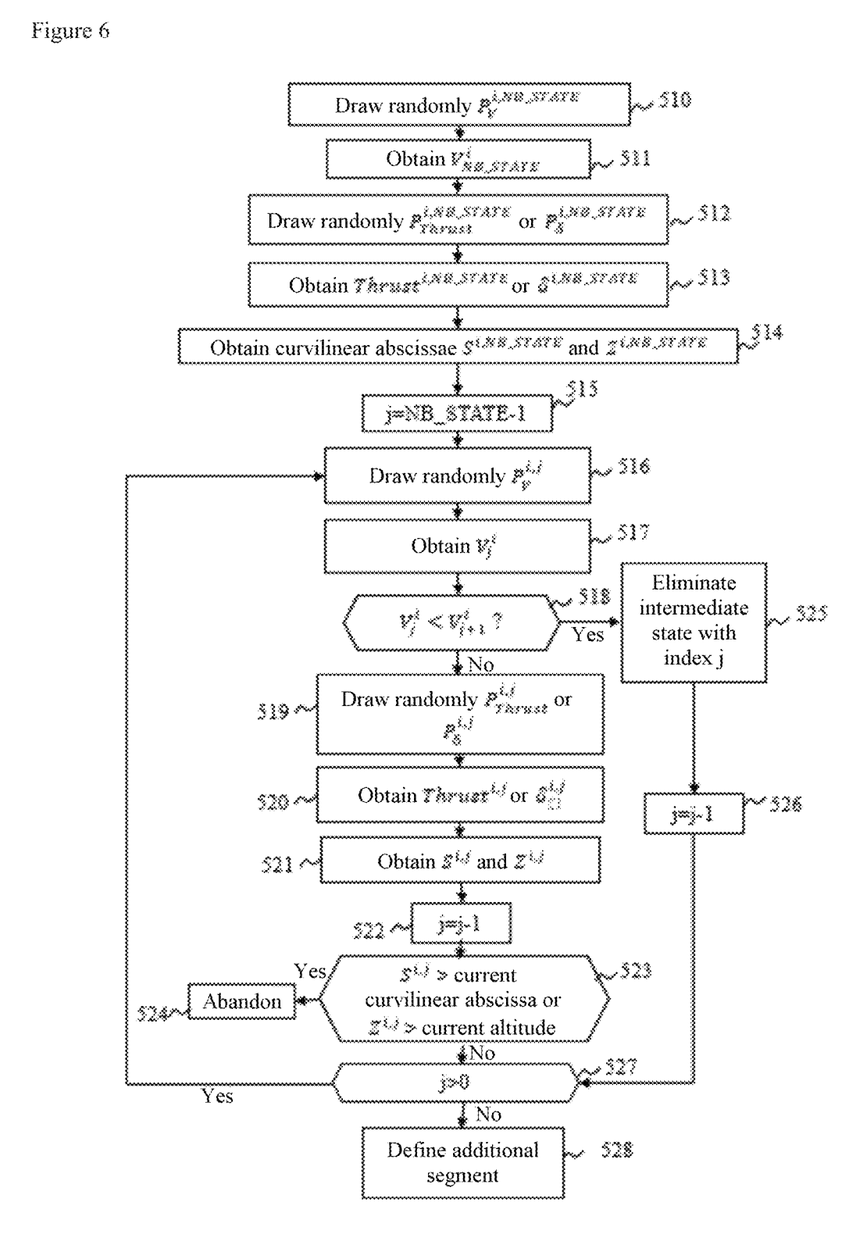

FIG. 6 details a procedure for definition of a flight strategy with index i included in the number of different flight strategies that is a multiple of four. In FIG. 6 it is assumed that there is no altitude or speed constraint in the flight plan concerning the descent/approach phase.

During the step 51 the intermediate states are worked through in order from the intermediate state closest to the target position to the farthest intermediate state. Each first value associated with each intermediate state is therefore defined in this order.

In a step 510, the optimization module 10 draws a random value $P_V^{i,STATE}$ in the range [0;1] for the intermediate state closest to the target position, the index NB_STATE of the random value being an identifier of the intermediate state closest to the target position.

In a step 511 the optimization module 10 obtains a speed $V_{NB\_STATE}^i$ of the aircraft 1 when it enters the intermediate state with index NB_STATE, that is to say when the aircraft 1 is put into the configuration corresponding to the segment associated with the intermediate state with index NB_STATE in the following manner:

$$V_{NB\_STATE}^i = V_{LST} + P_V^{i,NB\_STATE}(V_{LE} - V_{LST})$$

in which $V_{LE}$ (respectively $V_{LST}$) is the maximum (respectively minimum) speed in the aerodynamic configuration corresponding to the segment associated with the intermediate state with index NB_STATE. Note that the segment associated with the intermediate state with index NB_STATE is the segment closest to the target state because the intermediate states are worked through from the target state to the current state.

In a step 512 the optimization module 10 draws a random value $P_{Thrust}^{i,NB\_STATE}$ or a random value $P_\delta^{i,NB\_STATE}$ in the range [0;1].

In a step 513 the optimization module 10 obtains a thrust level $Thrust^{i,NB\_STATE}$ or a spoiler deflection level $\delta^{i,NB\_STATE}$ of the aircraft 1 when it passes through the intermediate state with index NB_STATE, that is to say when the aircraft 1 is put in the configuration corresponding to the segment associated with the intermediate state with index NB_STATE in the following manner:

$$Thrust^{i,NB\_STATE} = P_{Thrust}^{i,NB\_STATE} \times Thrust_{max}$$

$$\delta^{i,NB\_SEG} = P_\delta^{i,NB\_STATE} \times \delta_{max}$$

The choice to take for second value a thrust level $Thrust^{i,NB\_STATE}$ or a deflection level $\delta^{i,NB\_STATE}$ (and thus to use the random value $P_{Thrust}^{i,NB\_STATE}$ or the random value $P_\delta^{i,NB\_STATE}$) is random. However, some aerodynamic configurations not being compatible with triggering the spoilers, the optimization module 10 systematically chooses to take a second value in the form of a thrust level for these aerodynamic configurations.

Following the step 513, for the strategy with index i, the intermediate state with index NB_STATE is associated with a first value (i.e. a speed $V_{NB\_STATE}^i$) of configuring the aircraft 1) and a second value (i.e. a thrust level $Thrust^{i,NB\_STATE}$ or a deflection level $\delta^{i,NB\_STATE}$).

In a step 514 the optimization module 10 determines a curvilinear abscissa $S^{i,NB\_STATE}$ and an altitude $\delta^{i,NB\_STATE}$ at which the aircraft 1 attains the speed $V_{NB\_STATE}^i$ with the thrust level $Thrust^{i,NB\_STATE}$ or the spoiler deflection level $\delta^{i,NB\_STATE}$.

The curvilinear abscissa $S^{i,NB\_STATE}$ and the altitude $Z^{i,NB\_STATE}$ are obtained by the optimization module 10 using one or more performance models of the aircraft 1 (in the same way that the FMS 11 calculates different flight parameters such as time, fuel quantity, altitude and speed parameters along the flight plan) or by interpolation on the basis of performance tables of the aircraft 1. These performance tables have for example been precalculated on the ground using the performance model or models and then stored in the storage unit 104 of the optimization module 10. By using this performance model or these performance models (or these performance tables), the optimization module is able to calculate the curvilinear abscissa $S^{i,NB\_STATE}$ and the altitude $Z^{i,NB\_STATE}$ on the basis of the target state the flight parameters in which are known and the intermediate state with index NB_STATE of which here the speed $V_{NB\_STATE}^i$ and the thrust level $Thrust^{i,NB\_STATE}$ or the spoiler deflection level $\delta^{i,NB\_STATE}$ are known. Following the step 514, the intermediate state within index NB_STATE is therefore completely defined.

In a step 515 the optimization module 10 fixes a variable j representing an intermediate state index with value NB_STATE−1 to go to the second segment closest to the target position.

In a step 516 the optimization module 10 draws a random value $P_V^{i,j}$ in the range [0;1] for the intermediate state with index j.

In a step 517 the optimization module 10 attains a speed $V_j^i$ of the aircraft 1 when the aircraft 1 is put in the aerodynamic configuration corresponding to the segment associated with the intermediate state with index j in the following manner:

$$V_j^i = V_{LS}^j + P_V^{i,j}(V_{FE}^j - V_{LS}^j)$$

where $V_{FE}^j$ (respectively $V_{LS}^j$) is the maximum (respectively minimum) speed in the aerodynamic configuration corresponding to the segment associated with the intermediate state with index j.

In a step 518 the optimization module 10 verifies if the speed $V_j^i$ is less than the speed $V_{j+1}^i$ of configuring the aerodynamic configuration corresponding to the intermediate state with index j+1.

If the speed $V_j^i$ is less than the speed $V_{j+1}^i$, the optimization module 10 considers, during a step 525, that configuring the configuration corresponding to the intermediate state with index j is simultaneous with the configuring the configuration corresponding to the intermediate state with index j+1. That is to say, on passing through the intermediate state with index j+1, the optimization module 10 considers that the aircraft 1 goes directly from the aerodynamic configuration corresponding to the segment following the intermediate state with index j in the target state to current state direction (that is to say the segment associated with the intermediate state with index j−1 or the current state) in the aerodynamic configuration corresponding to the segment associated with the intermediate state with index j+1, without passing through the aerodynamic configuration corresponding to the segment associated with the intermediate state with index j. The intermediate state with index j is eliminated. A single segment then connects the intermediate state with index j+1 to the state following the intermediate state with index j. In practice, in this case, an aerodynamic configuration that the aircraft 1 could adopt is not used. For example, if there are four different slat configurations numbered from "1" to "4", the aircraft 1 goes directly from the configuration "1" to the configuration "3" without passing through the configuration "2".

In a step 526 the optimization module 10 decrements the value of j by one unit.

The step 526 is followed by a step 527.

If the speed $V_j^i$ is not less than the speed $V_{j+1}^i$, the optimization module 10 executes a step 519. During the step 519 the optimization module 10 draws a random value $P_{Thrust}^{i,j}$ or a random value $P_\delta^{i,j}$ in the range [0;1].

In a step 520 the optimization module 10 obtains a thrust level $Thrust^{i,j}$ or a spoiler deflection level $\delta^{i,j}$ of the aircraft 1 during configuration of the aircraft 1 in the aerodynamic configuration corresponding to the segment associated with the intermediate state with index j in the following manner:

$$Thrust^{i,j} = P_{Thrust}^{i,j} \times (Thrust_{max})$$

$$\delta^{i,j} = P_\delta^{i,j} \times (\delta_{max})$$

Once again, the choice to take for the second value a thrust value $Thrust^{i,j}$ or a deflection level $\delta^{i,j}$ (and thus to use the random value $P_{Thrust}^{i,j}$ or the random value $P_1\delta^T(i,j)$) is random subject to taking into account any incompatibilities between the triggering of the spoilers and the aerodynamic configuration corresponding to the segment associated with the intermediate state with index j.

In a step 521 the optimization module 10 determines a curvilinear abscissa $S^{i,j}$ and an altitude $Z^{i,j}$ at which the aircraft 1 attains the speed $V_j^i$ with the thrust level $Thrust^{i,j}$ or the spoiler deflection level $\delta^{i,j}$.

As during the step 514, the curvilinear abscissa $S^{i,j}$ and the altitude $Z^{i,j}$ are obtained by the optimization module 10 using one or more models (or tables) of performance of the aircraft 1 and taking into account the intermediate state with index j+1 for which the speed $V_{j+1}^i$, the thrust level $Thrust^{i,j+1}$ or the spoiler deflection level $\delta^{i,j+1}$ is known, the altitude $S^{i,j+1}$ and the curvilinear abscissa $Z^{i,j+1}$ and the intermediate state with index j for which the speed $V_j^i$ and the thrust level $Thrust^{i,j}$ or the spoiler deflection level $\delta^{i,j}$ is known here. Following the step 521 the intermediate state with index j is completely defined.

During a step 522 the optimization module 10 decrements the value of j by one unit.

In a step 523 the optimization module compares the curvilinear abscissa $S^{i,j}$ to the current curvilinear abscissa and the altitude $Z^{i,j}$ to the current altitude. If the curvilinear abscissa $S^{i,j}$ is greater than the current curvilinear abscissa and/or the altitude $Z^{i,j}$ is greater than the current altitude the optimization module 10 abandons the strategy with index i being defined in a step 524.

Otherwise the step 523 is followed by the step 527.

During the step 527 the optimization module 10 tests the value of the index j.

If the index j is greater than zero the optimization module 10 returns to the step 516 in order to go to the next intermediate state.

If the index j is equal to zero the optimization module 10 defines, in a step 528, an additional segment enabling a return to the current state for the strategy with index i.

On the basis of the intermediate state closest to the current state of the aircraft 1, the current speed of the aircraft 1 and the current thrust level or current spoiler deflection level the optimization module 10 determines, as in the step 514, a curvilinear abscissa and an altitude corresponding to the current speed using the model or models (or tables) of performance of the aircraft 1. The curvilinear abscissa (respectively the altitude determined) is termed the modelled curvilinear abscissa (respectively modelled altitude). It is highly improbable that the additional segment obtained at this stage passes through the current state. Generally speaking, a single value among the current speed, the current curvilinear abscissa and the current altitude is attained before the other two. The additional segment must then be corrected. A number of situations are then to be considered:

A. If the modelled altitude is greater than the current altitude, it is because the additional segment attains the current altitude before the current curvilinear abscissa and the current speed are attained. The optimization module 10 then considers that the aircraft 1 is passing through a steady state corresponding to the current altitude and an acceleration is applied to the aircraft 1 to attain the current speed over the distance remaining to be travelled to the current curvilinear abscissa.

B. If the modelled curvilinear abscissa is greater than the current curvilinear abscissa, it is because the additional segment attains the current abscissa first. The optimization module 10 then works back along the segments already defined in an iterative manner in the direction of the target state. On each iteration the optimization module 10 tests a new point of a segment and, using the model or models (or tables) of performance, determines if that point enables a return to the current altitude and the current speed when the aircraft 1 passes through the current curvilinear abscissa. As soon as a point of a segment satisfies these conditions, the flight parameters corresponding to that point are used to create a new state termed an additional state. The additional segment then connects the additional state to the current state. A segment moreover connects the intermediate state closest to the current state to the additional state. Note that if the point found is located on a segment associated with an intermediate state each intermediate state after the found point (in the target state to current state direction) is eliminated.

C. If the modelled curvilinear abscissa is less than the current curvilinear abscissa and the modelled altitude is less than the current altitude, it is because the additional segment attains the current speed before the current altitude and the current curvilinear abscissa. It is then necessary for the aircraft 1 to climb to the current altitude and return to the current curvilinear abscissa. Two situations then arise:

If the distance to be travelled from the curvilinear abscissa of the intermediate state closest to the current state to the current curvilinear abscissa is sufficient for the aircraft 1 at constant speed to be able to attain the current altitude, the optimization module 10 considers that on the basis of the intermediate state closest to the current state the altitude of the aircraft 1 is increased at a constant rate until the current altitude of the aircraft 1 is attained. As soon as the current altitude is attained the optimization module 10 considers that the aircraft 1 is passing through a steady state corresponding to the current altitude at which the aircraft 1 is flying at the current speed to the current curvilinear abscissa.

If the distance to be travelled from the curvilinear abscissa of the intermediate state closest to the current state to the current curvilinear abscissa is insufficient for the aircraft 1 at constant speed to be able to attain the current altitude, the optimization module 10 works back through the segments already defined iteratively in the direction of the target state until a point is found that enables a return to the current altitude and the current speed when the aircraft 1 passes through the current curvilinear abscissa. As in situation B, as soon as in an iteration a point of a segment satisfies these conditions the flight parameters corresponding to that point are used to create an additional state. That additional state is then connected segment by segment on the one hand to the intermediate state closest to the current state and on the other hand to the current state. Once again, if the found point is located on a segment associated with an intermediate state each intermediate state after the found point (in the target state to current state direction) is eliminated.

D. If the modelled altitude and the modelled curvilinear abscissa are respectively greater than the current altitude and the current curvilinear abscissa the optimization module 10 determines if it is the current altitude or the current curvilinear abscissa that was attained first. To this end the optimization module 10 determines a modelled curvilinear abscissa on the basis of the intermediate state closest to the current state of the aircraft 1, the current speed, the current thrust level or the current spoiler deflection level using the model or models (or tables) of performance of the aircraft 1, the modelled altitude being set at the current altitude. If the modelled curvilinear abscissa determined is greater than the current curvilinear abscissa the optimization module deduces from this that the segment attained the current curvilinear abscissa first. The optimization module 10 then reverts to situation B. If the modelled curvilinear abscissa is less than the current curvilinear abscissa the optimization module determines from this that the segment attained the current altitude first. The optimization module then reverts to situation A.

At the end of the procedure from FIG. 6 used to define a strategy i, the optimization module therefore attains a set of characteristics of the strategy i comprising rates of configuration $V_j^i$ and thrust levels $Thrust^{i,j}$ or deflection $\delta^{i,j}$ (for j from "1" to NB_SEG) and flight parameters of the additional segment. Note that, although the FIG. 6 method has been applied to a speed profile, by determining for each intermediate state an altitude and a curvilinear abscissa corresponding to that intermediate state, it makes it possible also to determine an altitude profile. The method from FIG. 6 could also have been applied to an altitude profile, which would have enabled determination of a speed profile in the same manner.

Returning to FIG. 5, in a step 52 the optimization module 10 randomly groups the strategies of the first set two by two so as to form first pairs of strategies.

In a step 53 the optimization module 10 obtains a cost according to at least one predefined criterion (i.e. according to the energy consumption criterion in this embodiment) for each strategy of each first pair. The cost of a strategy is a cost of transition between the current state and the target state of the aircraft 1. As described above the transition between the current state and the target state is not direct but via a plurality of states corresponding to the points of passage between each segment of the speed profile enabling definition of the strategy. The cost of the strategy is therefore a sum of the costs of transition between the states successively taken by the aircraft 1 in that strategy.

In one embodiment the cost of transition between two states is calculated by the optimization module 10 using the model or models (or tables) of performance of the aircraft 1.

For example, one performance model of the aircraft 1 is an engine performance model. On the basis of a thrust level calculated incorporating the vertical trajectory of the aircraft 1, this module makes it possible to know the corresponding fuel consumption. When the performance model is a time model the time is deduced from an evolution of the speed and of the curvilinear abscissa of the aircraft 1 over the vertical trajectory of the aircraft 1.

In a step 54 the optimization module 10 reduces the first set by eliminating the strategy of each first pair having the highest cost. The strategies eliminated in this step are no longer considered in the remainder of the method.

In a step 55 the optimization module 10 randomly groups the remaining strategies of the first set two by two to form second pairs of strategies.

In a step 56, for each second pair, the optimization module 10 adds a new strategy to the first set. That is to say, for each second pair, the optimization module forms a new strategy of the first set on the basis of the first and second values associated with each intermediate state of the strategies of the second pair. The first and second values associated with each intermediate state of the new strategy are each respectively equal to the first and second values of an intermediate state corresponding to one of the two strategies of the pair chosen randomly. For example, if a first strategy of a second pair has an index A and a second strategy of the second pair has an index B, for each value of the index j between "1" and NB_STATE, the optimization module 10 chooses randomly between the speed $V_j^A$ and the speed $V_j^B$ and between the thrust level $Thrust^{A,j}$ (or the deflection level $\delta^{A,j}$) and the thrust level $Thrust^{B,j}$ (or the deflection level $\delta^{B,j}$). To finalize the new strategy an additional segment is added thereto as described with reference to step 528.

In a step 57 the optimization module 10 adds to the first set strategies different from the strategies already considered until the number of strategies that is a multiple of four is attained. It uses for this for example the procedure described with reference to FIG. 6 and eliminating all strategies that have already been considered beforehand in the first set.

In a step 58 the optimization module 10 looks for the best strategy (i.e. the strategy offering the lowest cost) among the strategies of the first set.

The steps 52 to 58 are executed iteratively or as long as there is a cost difference between the best strategy of the current iteration and the best strategy of the iteration preceding the current iteration is greater than a predetermined threshold TH. If the difference is greater than or equal to the predetermined threshold TH, the optimization module 10 returns to step 52. If the difference is less than the predetermined threshold TH, the optimization module 10 selects the best strategy of the current iteration and defines the optimum vertical trajectory on the basis of that strategy.

In one embodiment there are constraints on the flight plan concerning the descent/approach phase. The constraints of the flight plan are for example altitude constraints or speed constraints over certain portions of the flight plan, that is to say certain ranges of curvilinear abscissae. These constraints are supplied to the optimization module 10 by the FMS 11.

In a speed profile each constraint appears in the form of a sub-segment between two constrained states: a start of constraint state and an end of constraint state. The start and end of constraint states are located between two intermediate states or between the target state and an intermediate state or between an intermediate state and the current state. A segment connecting two intermediate states or the target state to an intermediate state or an intermediate state to the current state in the absence of constraints is then broken down into sub-segments in the presence of constraints. Working along the speed profile from the target state to the current state, breaking a segment down into sub-segments in the case of constraints comprises creation of a sub-segment or transition between the end of constraint state and the intermediate state or target state preceding the end of constraint state, creation of a sub-segment or transition between the start of constraint state and the end of constraint state and creation of a sub-segment of transition between the start of constraint state and the intermediate or current state following the start of constraint state. If the constraint is a speed constraint the sub-segment corresponding to the constraint takes the form of a speed steady state over which the altitude of the aircraft 1 decreases. If the constraint is an altitude constraint the speed decreases over the sub-segment corresponding to the constraint. The cost of transition between two states corresponding to the start and to the end of a sub-segment is calculated using the model or models (or tables) of performance of the aircraft 1 in the same manner as the cost of transition between two states corresponding to the start and to the end of a segment.

Note that one of the constrained states bracketing a sub-segment may coincide with an intermediate state.

Figure 3:
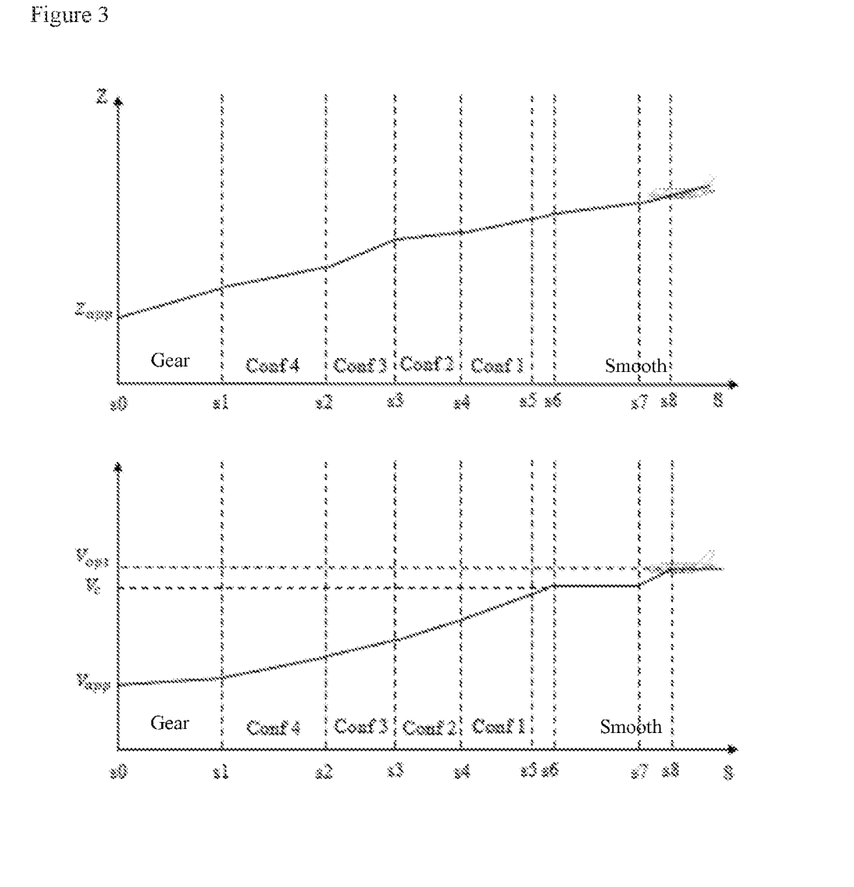
FIG. 3 represents an example of a speed profile and an example of an altitude profile corresponding to a flight strategy in a descent/approach phase of the aircraft.

FIG. 3 represents an example of a speed profile and an example of an altitude profile corresponding to a strategy defined during the execution of the procedure from FIG. 6. In this example the aircraft 1 may assume six aerodynamic configurations during the descent/approach phase:

a "smooth" configuration in which the slats are not deployed and the landing gear is not lowered;
a configuration "conf1" in which the slats are positioned in a first predefined position;
a configuration "conf2" in which the slats are positioned in a second predefined position;
a configuration "conf3" in which the slats are positioned in a third predefined position;
a configuration "conf4" in which the slats are positioned in a fourth predefined position;
a "gear" configuration in which the landing gear is lowered.

The start and end curvilinear abscissae of the "gear" configuration are respectively s0 and s1. The start and end curvilinear abscissae of the configuration "conf4" are respectively s1 and s2. The start and end curvilinear abscissae of the configuration "conf3" are respectively s2 and s3. The start and end curvilinear abscissae of the configuration "conf2" are respectively s3 and s4. The start and end curvilinear abscissae of the configuration "conf1" are respectively s4 and s5. The start and end curvilinear abscissae of the "smooth" configuration are respectively s5 and s8. In this example there exists a speed constraint $V_c$ over a range of curvilinear abscissae concerning the "smooth" configuration. The segment concerning the smooth configuration is therefore broken down into three sub-segments: a first segment starting from an intermediate state corresponding to entry into the configuration 1 and joining the end of constraint state, a second segment between the end of constraint state and the start of constraint state, and a third segment starting from the start of constraint state and joining the current state of the aircraft 1.

In each profile the point with abscissa s0 (respectively s1, s2, s3, s4, s5, s8) corresponds to the target state (respectively a first intermediate state, a second intermediate state, a third intermediate state, a fourth intermediate state, a fifth intermediate state and the current state). The point with abscissa s6 corresponds to the end of constraint state. The segment connecting the point with abscissa s7 to the point with abscissa s8 is an additional segment enabling a return to the current state. The point with abscissa s7 therefore corresponds to an additional state and to a start of constraint state. Each intermediate state is associated with an altitude and speed configuration.

In one embodiment the predefined criterion is a flight time, noise, NOx production criterion or any other pertinent criterion concerning an aircraft or a combination of two or more criteria.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating an optimum vertical trajectory of a flight trajectory of an aircraft in a descent/approach phase, the vertical trajectory being defined between a current state of the aircraft comprising a current position and a target state comprising a target position, the vertical trajectory being defined on a basis of a profile of a value representing a kinetic and potential energy of the aircraft as a function of a curvilinear abscissa of the aircraft along a flight plan, the profile corresponding to a transition between the current state and the target state and being broken down into a plurality of successive segments each corresponding to one or more aerodynamic configuration that the aircraft can adopt during a descent/approach phase, each junction point between two segments corresponding to a passage of the aircraft through an intermediate state, each transition between two states enabling dissipation of a portion of the kinetic and potential energies of the aircraft between the two states, wherein the method is executed by an avionic system onboard the aircraft and comprises successive steps of:

a processing step during which the avionic system works through the profile from the target state to the current state and obtains, for each segment preceding an intermediate state, termed an associated segment, a range of values representing kinetic potential energy of the aircraft authorized for the aerodynamic configuration corresponding to the segment, termed an authorized range;

a definition step during which the avionic systems defines the optimum vertical trajectory on a basis of a flight strategy minimizing a cost according to at least one particular predefined criterion in a set of flight strategies, termed a first set, each strategy of the first set being defined by associating first and second values with each intermediate state, each first value corresponding to a value representing the kinetic and potential energy of the aircraft when the aircraft enters the intermediate state chosen randomly in the authorized range corresponding to the segment associated with the state, each second value being a level of thrust of at least one engine of the aircraft or a level of deflection of spoilers of the aircraft chosen randomly in a range of possible values, then adding to the strategy an additional segment enabling the strategy to rejoin the current state, the flight strategy minimizing the cost being determined during a final iteration of an iterative procedure comprising on each iteration;

a grouping step during which the avionic system groups the strategies of the first set two by two to form first pairs of strategies;

an obtaining step during which the avionic system obtains cost of each strategy, the cost of a strategy depending on values comprising the first and second values associated with each intermediate state of the strategy;

a reduction step during which the avionic system reduces the first set by eliminating the strategy of each first pair having the highest cost;

a step of formation of new strategies during which the avionic system groups remaining strategies of the first set two by two to form second pairs of strategies, and during which, for each second pair, the avionic system forms a new strategy of the first set on a basis of the first and second values associated with each intermediate state of the strategies of the second pair;

a completion step during which the avionic system adds to the first set strategies different from the strategies already considered until a number of strategies that is a multiple of four is attained; and a determination step during which the avionic system determines the strategy of the first set, termed a best strategy, minimizing the cost;

the iterative procedure being repeated by the avionic system as long as a cost difference between best strategies of two successive iterations is greater than a predetermined threshold.

2. The method according to claim 1, wherein each value representing a kinetic and potential energy of the aircraft is, respectively, a speed and an altitude along the vertical trajectory.

3. The method according to claim 1, wherein the predefined criterion is a fuel consumption and/or flight time and/or noise and/or nitrogen oxide emission criterion.

4. The method according to claim 1, wherein the method comprises a step of taking account of constraints during which the avionic system obtains constraints of the flight plan comprising altitude and/or speed constraints to be complied with over certain portions of the descent/approach phase and divides into sub-segments the segments concerned by the constraints.

5. The method according to claim 1, wherein during definition of a strategy the first value associated with each intermediate state is defined successively for each intermediate state by working through the intermediate states in order from an intermediate state closest to the target position to a farthest intermediate state and if a first value of a first intermediate state is less than a first value of a second intermediate state preceding the first intermediate state, the first intermediate state is eliminated and a segment is created for directly connecting the second intermediate state to a state following the first intermediate state.

6. An avionic system for generating an optimum vertical trajectory of a flight trajectory of an aircraft in a descent/approach phase, the vertical trajectory being defined between a current state of the aircraft comprising a current position and a target state comprising a target position, the vertical trajectory being defined on a basis of a profile of a value representing a kinetic and potential energy of the aircraft as a function of a curvilinear abscissa of the aircraft along a flight plan, the profile corresponding to a transition between the current state and the target state and being broken down into a plurality of successive segments each corresponding to one or more aerodynamic configuration that the aircraft can adopt during a descent/approach phase, each junction point between two segments corresponding to a passage of the aircraft through an intermediate state, each transition between two states enabling dissipation of a portion of the kinetic and potential energy of the aircraft between the two states, wherein the avionic system comprises:
- a processor for working through the profile from the target state to the current state and the system configured for obtaining, for each segment preceding an intermediate state, termed an associated segment, a range of values representing the kinetic and potential energy of the aircraft authorized for the aerodynamic configuration corresponding to the segment, termed an authorized segment;
- the system configured for defining the optimum vertical trajectory on a basis of a flight strategy minimizing a cost according to at least one particular predefined criterion in a set of flight strategies, termed a first set, each strategy of the first set being defined by associating first and second values with each intermediate state, each first value corresponding to a value representing the kinetic and potential energy of the aircraft when the aircraft enters the intermediate state chosen randomly in an authorized range corresponding to the segment associated with the state, each second value being a level of thrust or a level of deflection of the spoilers chosen randomly in a range of possible values, then by adding to the strategy an additional segment representing a transition between the intermediate state closest to the current state and the current state, the system configured such that the flight strategy minimizing the cost is determined by executing an iterative procedure during a final iteration of the iterative procedure;
- wherein the system is configured for executing the iterative procedure by:
  - grouping of the strategies of the first set two by two to form first pairs of strategies;
  - obtaining cost of each strategy, the cost of a strategy depending on values comprising the first and second values associated with each intermediate state of the strategy;
  - reducing the first set by eliminating the strategy of each first pair having the highest cost;
  - forming new strategies enabling grouping of remaining strategies of the first set two by two to form second pairs of strategies, and, for each second pair, forming a new strategy of the first set from the first and second values associated with each intermediate state of the strategies of the second pair;
  - adding to the first set strategies different from the strategies already considered until a number of strategies that is a multiple of four is attained;
  - determining the strategy of the first set, termed a best strategy, minimizing the cost; and,
  - halting the iterative procedure terminating the iterative procedure if a cost difference between best strategies of two successive iterations is less than a predetermined threshold.

* * * * *